March 29, 1932.   R. R. ROYAL ET AL   1,851,449
TRUCK FOR TRANSPORTING LOCOMOTIVE AND CAR WHEELS
Filed Nov. 21, 1929
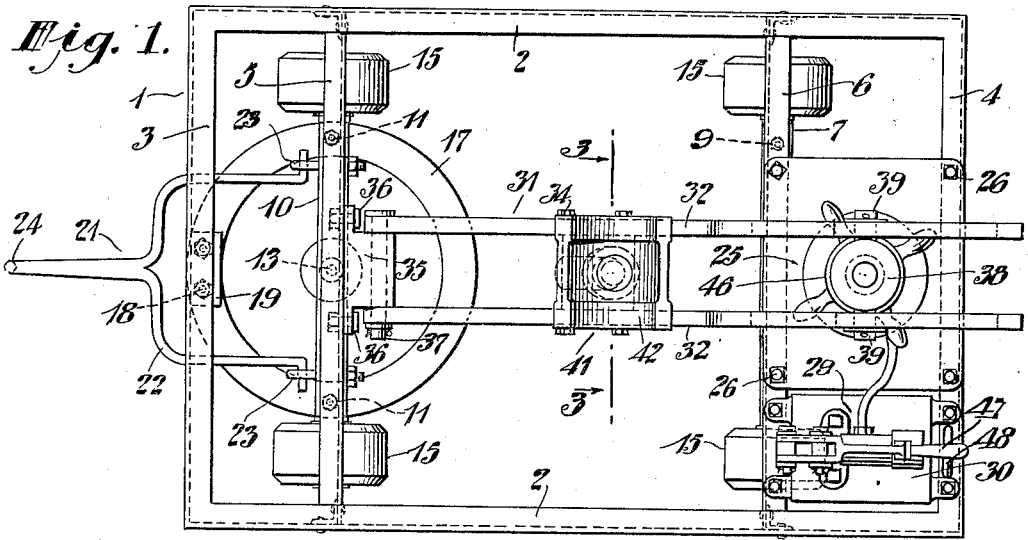
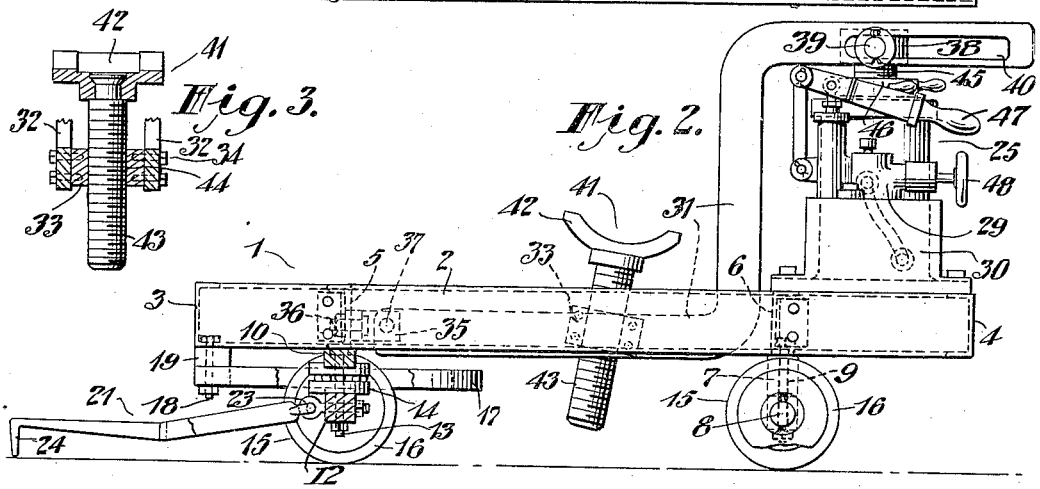
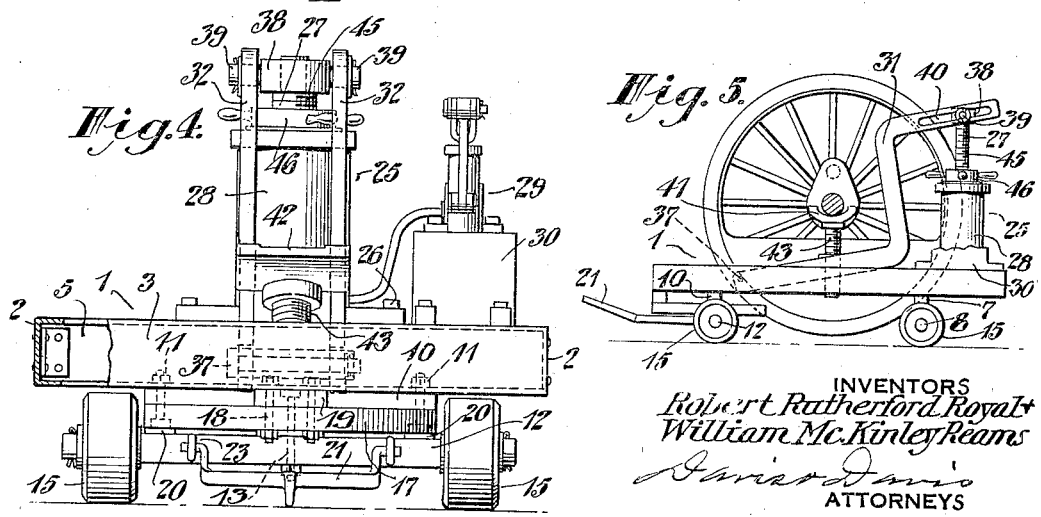
INVENTORS
Robert Rutherford Royal
William McKinley Reams
ATTORNEYS Patented Mar. 29, 1932

1,851,449

UNITED STATES PATENT OFFICE

ROBERT RUTHERFORD ROYAL AND WILLIAM McKINLEY REAMS, OF PADUCAH, KENTUCKY, ASSIGNORS TO THE WATSON-STILLMAN CO., OF NEW YORK, N. Y., A CORPORATION OF NEW JERSEY

TRUCK FOR TRANSPORTING LOCOMOTIVE AND CAR WHEELS

Application filed November 21, 1929. Serial No. 408,763.

An important object of the present invention is to provide improved means for handling and transporting a ponderous unit consisting of an axle and mounted wheels of a locomotive or car.

In the drawings:

Fig. 1 is a top plan view of a truck device embodying the invention;

Fig. 2 a side view of the truck device partly in section;

Fig. 3 a detail section taken on the line 3—3 of Fig. 1;

Fig. 4 an end view of the truck partly in section; and

Fig. 5 a side view upon a reduced scale showing the truck device supporting a locomotive driving unit for transportation.

The truck structure includes a body 1 in the form of a rigid metal frame of rectangular shape. The sides 2 and ends 3 and 4 of the frame are of channel form in cross section. Extending across the frame, near the ends thereof, are two channel beams 5 and 6 whose ends are secured to the sides 2 of the frame.

A bolster 7 and a rear axle 8 are bolted as at 9 to the under side of the crossbeam 6 and a front bolster 10 is bolted as at 11 to the under side of crossbeam 5. Beneath the bolster 10 is a front axle 12 which is swiveled to the bolster by a king bolt 13. A roller bearing 14 is interposed between the front axle and the bolster and encircles the king bolt, to reduce the friction at the swivel point. Upon the spindle ends of the axles are mounted wheels 15 of relatively small diameter, provided with thick, solid rubber tires 16. In addition to roller bearing 14 a circular axle bearing 17 of material diameter is interposed between the front axle and the bolster 10 and is bolted to the latter by the bolts 11. It is also bolted to the front end of the body frame as at 18, through an interposed spacer block 19. At opposite sides of the king bolt the front axle is provided with bumpers 20 to engage the bearing 17. The length of the axles and of the bolsters is materially less than the width of the truck body and they are of slight depth so that the wheels are spaced inwardly from the sides of the body and the latter is supported only slightly elevated above the wheels. Connected to the front axle is a short draught tongue 21 for pulling and steering the truck. The tongue is formed with a fork or yoke portion 22 hinged to the front axle, as at 23, at opposite sides of the king bolt. At its front end the tongue is formed with a hook 24 to be engaged by any suitable draught means.

At the rear end of the truck a hydraulic jack 25 is centrally mounted upon the frame end 4 and the crossbeam 6, and bolted thereto as at 26. This jack is of a standard form and includes a ram 27 and a ram cylinder 28. A manually operable pump 29 of standard form is mounted upon a fluid supply tank 30 secured to the truck body beside the jack and has fluid connections with the latter for operating it.

The jack 25 is for the purpose of raising and lowering a lifting beam 31 and a load supported by the latter. Beam 31 is formed by a pair of bars 32 of the same shape and size and held in spaced parallel relation by a spacer block 33. The latter is disposed between the bars, intermediate the ends thereof, and is bolted to the bars as at 34. The beam is disposed to extend centrally fore-and-aft of the truck body and its front end is pivotally connected to the crossbeam 5. The pivotal connection is formed by a block 35 bolted to the rear side beam 5 as at 36 and formed with a spacer portion fitting between the forward ends of the bars 32. A headed pivot pin 37 passes through registering apertures in the block and the beam end and is held in place by a cotter pin. The beam bars 32 are formed to extend straight rearwardly from their pivotal connection to a point just in front of the crossbeam 6 and the jack. From this point they extend upwardly to a point above the level of the body of the jack, and then straight rearwardly past opposite sides of a head 38 upon the jack ram. The ram head is provided with radial pins 39 which extend through longitudinal slots 40 formed in the rear end portions of the beam bars. Thereby the jack is operatively connected to the beam for raising and lowering it.

Mounted upon the lifting beam is a device 41 for engaging and supporting the axle of a pair of locomotive driving wheels. This device comprises a bearing head 42, concave at its upper side, and formed with or fixed to, a strong downwardly extending shank 43. The latter is threaded and is screwed downwardly through a threaded bore 44 formed in the spacer block 33. Thereby the device is mounted for vertical adjustment upon the beam. In its normal depressed position which the beam occupies when the jack ram is down, the front portion of the beam, extending between its pivot and the jack, is disposed horizontally between the sides of the truck frame. The spacer block 33, however, is set slightly askew so that its threaded bore 44 is at a slight angle to the vertical. This inclines the supporting device 41 rearwardly in its depressed position so that when raised by the beam it will assume a position with its shank vertical, or substantially so, and the load thrust will be transmitted straight downward.

The ram of the jack is threaded as at 45 and mounted thereon is a nut 46 which is adapted to be manually screwed along the ram to abut the upper end of the ram cylinder or the jack body. Thereby the jack ram and its supported load may be positively held in an elevated position independent of any leak down of fluid pressure in the jack.

Heretofore the handling and transportation of the ponderous unit formed by a pair of locomotive driving wheels mounted upon their axle has been an exceedingly difficult operation. In moving the unit from place to place in a shop, roundhouse or yard it is customary to roll it, and since there is no way to steer it, it is extremely difficult to make a turn. To change its course the wheels must often be dragged and turned upon the floor in such a manner that their flanges cut up the floor. This wear is also injurious to the flanged wearing surfaces of the wheels. Often special hoisting apparatus must be brought into action for turning the unit.

The present invention is designed to avoid all of the above difficulties and greatly facilitate the handling and transportation of such a locomotive driving unit. The front portion of the truck device is built low to provide clearance for free pasage beneath the axle to bring the axle-supporting device 41 into a position directly beneath the axle. The handle 47 of the pump is then operated to elevate the ram and the load, and the nut 46 is screwed down to positively lock the ram in an elevated position. The lifting beam 31, supporting device 41, is a lever of the second class so that the jack has a good mechanical advantage for lifting the load. When the load is lifted and supported it may be conveyed to its destination without difficulty by the dirigible truck. The supported driving wheels are held out of contact with the floor and the latter is further protected by the rubber tires of the truck. When the destination of the load is reached the jack ram is released by screwing the nut 46 upward and turning the handle 48 of a fluid return valve in the pump. This permits the driving wheels to settle gradually upon the floor, and permits the device 41 to move free of the axle. The freed truck may then be rolled away. The screw mounting of the device 41 provides for an approximate vertical adjustment of the device to suit the requirements of the work and thereby avoid unnecessary operation of the jack. The entire apparatus is designed throughout for a satisfactory performance of its work.

While we have shown and described a very satisfactory form of our invention we do not wish to be limited strictly to this disclosure but reserve the right to make such changes as will be within the scope of the claims.

What we claim is:

1. A truck for lifting and transporting an axle and mounted wheels of a locomotive or railway car, comprising a truck body; a pair of front wheels and a pair of rear wheels supporting said truck body at a low elevation to roll beneath the axle; a lifting beam extending fore and aft of the truck body and pivoted at one end at a low elevation; a hydraulic jack supported by the truck body; an operative connection between said jack and the free end of said beam for raising the latter; a load-supporting device carried by the beam for engaging the locomotive or car axle and supporting it together with the mounted wheels, said supporting device being located at an intermediate point in the length of the beam and approximately midway between the front and rear truck wheels for substantially even distribution of the load to the truck wheels, and the truck being free of obstructions from one end thereof inward to the said supporting device in the lowermost position of the latter to permit the truck to roll beneath the axle and dispose the supporting device beneath it.

2. A truck for lifting and transporting an axle and mounted wheels of a locomotive or railway car, comprising a substantially flat truck body; front and rear wheels supporting said body at a low elevation to roll beneath the axle; a lifting beam extending fore and aft of the truck body and pivoted at one end at a low elevation; a hydraulic jack supported upon the truck body adjacent the free end of the said beam and having a vertical threaded ram; an operative connection between said ram and the free end of the beam for raising the latter; a load-supporting device carried by the beam at an intermediate point in the length of the beam and approximately midway between the front and rear truck wheels for substantially even distribution of the load to the wheels, said device being engageable with the axle for lifting and supporting it together with its mounted wheels; and a locking nut screwed upon the threaded jack ram and having a projecting handle for manually turning the nut and locking the ram in an elevated position; the truck being free of obstructions from one end thereof inward to the load-supporting device to permit the truck to roll beneath the axle and dispose the supporting device beneath it.

3. A truck for lifting and transporting an axle and mounted wheels of a locomotive or railway car, including a truck body comprising a substantially flat, rigid, open frame and transverse beams spaced inward from the frame ends and rigidly connected to the opposite sides of the frame; front and rear truck axles secured to and beneath said beams, one of said axles being swiveled for steering the truck; a draught tongue connected to said swiveled axle, small front and rear truck wheels carried by said axles and disposed within the space bounded by the vertical planes of the outer edges of the truck body; a load-lifting beam pivoted at one end to one of said transverse beams, extending longitudinally within the truck frame and across the other transverse beam and formed with an elevated free end; a vertical hydraulic jack supported by the truck body directly beneath the elevated end of the lifting beam and having a threaded ram; an operative connection between the jack ram and the free end of the lifting beam; a locking nut screwed upon the ram and adjustable to hold the ram elevated; and a load-engaging and supporting device carried by the lifting beam at an intermediate point in the length of the beam and approximately midway between the front and rear truck wheels and engageable with an axle of a locomotive or car to lift and support it together with the mounted wheels.

In testimony whereof we hereunto affix our signatures this 14th day of November, 1929.

ROBERT RUTHERFORD ROYAL.
WILLIAM McKINLEY REAMS.